(12) United States Patent
Sonoyama et al.

(10) Patent No.: US 10,903,495 B2
(45) Date of Patent: Jan. 26, 2021

(54) ELECTRODE MATERIAL FOR BATTERY AND METHOD FOR MANUFACTURING SAME

(71) Applicants: NAGOYA INSTITUTE OF TECHNOLOGY, Nagoya (JP); NGK INSULATORS, LTD., Nagoya (JP)

(72) Inventors: Noriyuki Sonoyama, Nagoya (JP); Tatsuya Hattori, Nagoya (JP); Kenshin Kitoh, Nagoya (JP)

(73) Assignees: Nagoya Institute of Technology, Nagoya (JP); NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/108,635

(22) Filed: Aug. 22, 2018

(65) Prior Publication Data

US 2018/0358617 A1    Dec. 13, 2018

Related U.S. Application Data

(63) Continuation of application No. PCT/JP2017/009499, filed on Mar. 9, 2017.

(30) Foreign Application Priority Data

Mar. 25, 2016 (JP) .................................. 2016-062182

(51) Int. Cl.
*H01M 4/583* (2010.01)
*C01G 53/00* (2006.01)
(Continued)

(52) U.S. Cl.
CPC ............. *H01M 4/583* (2013.01); *C01G 45/00* (2013.01); *C01G 49/00* (2013.01); *C01G 53/00* (2013.01);
(Continued)

(58) Field of Classification Search
CPC ........ C01G 45/00; C01G 49/00; C01G 53/00; C01P 2002/22; C01P 2002/72;
(Continued)

(56) References Cited

U.S. PATENT DOCUMENTS 9,048,511 B2    6/2015  Mizuno
2008/0293957 A1  11/2008  Winters et al.
(Continued)

FOREIGN PATENT DOCUMENTS

CN      102956875 A  *  3/2013  .............. H01M 4/26
JP      2009-044009 A1   2/2009
(Continued)

OTHER PUBLICATIONS

Machine Translation CN102956875(A) (Year: 2013).*
(Continued)

*Primary Examiner* — Victoria H Lynch
(74) *Attorney, Agent, or Firm* — Burr & Brown, PLLC (57) ABSTRACT

There is disclosed an electrode material for cells. The electrode material includes carbon, and a crystalline material composed of a layered double hydroxide and/or a cation-deficit metal oxide having a rock-salt structure. Carbon is complexed with the cation-deficit metal oxide and/or the layered double hydroxide.

23 Claims, 5 Drawing Sheets

(51) Int. Cl.

| | | |
|---|---|---|
| *C01G 45/00* | (2006.01) | |
| *H01M 4/525* | (2010.01) | |
| *C01G 49/00* | (2006.01) | |
| *H01M 4/1391* | (2010.01) | |
| *H01M 4/505* | (2010.01) | |
| *H01M 4/485* | (2010.01) | |
| *H01M 4/62* | (2006.01) | |
| *H01M 4/36* | (2006.01) | |
| *H01M 4/04* | (2006.01) | |
| *H01M 4/50* | (2010.01) | |
| *H01M 4/52* | (2010.01) | |
| *H01M 4/90* | (2006.01) | |
| *H01M 8/083* | (2016.01) | |
| *H01M 12/08* | (2006.01) | |
| *H01M 10/0525* | (2010.01) | |

(52) U.S. Cl.
CPC ....... *H01M 4/0471* (2013.01); *H01M 4/1391* (2013.01); *H01M 4/362* (2013.01); *H01M 4/485* (2013.01); *H01M 4/50* (2013.01); *H01M 4/505* (2013.01); *H01M 4/52* (2013.01); *H01M 4/525* (2013.01); *H01M 4/625* (2013.01); *H01M 4/9016* (2013.01); *C01P 2002/22* (2013.01); *C01P 2002/72* (2013.01); *C01P 2002/88* (2013.01); *C01P 2004/03* (2013.01); *C01P 2004/64* (2013.01); *H01M 8/083* (2013.01); *H01M 10/0525* (2013.01); *H01M 12/08* (2013.01); *Y02E 60/10* (2013.01)

(58) Field of Classification Search
CPC .............. C01P 2002/88; C01P 2004/03; C01P 2004/64; H01M 10/0525; H01M 12/08; H01M 4/0471; H01M 4/1391; H01M 4/362; H01M 4/485; H01M 4/50; H01M 4/505; H01M 4/52; H01M 4/525; H01M 4/583; H01M 4/625; H01M 4/9016; H01M 8/083

See application file for complete search history.

(56) References Cited

U.S. PATENT DOCUMENTS

| | | | |
|---|---|---|---|
| 2008/0300352 A1* | 12/2008 | Schomaker | ........... C01B 13/363 |
| | | | 524/381 |
| 2011/0183201 A1 | 7/2011 | Genin et al. | |
| 2017/0192309 A1* | 7/2017 | Zhou | ................. G02F 1/133788 |

FOREIGN PATENT DOCUMENTS

| | | |
|---|---|---|
| JP | 2009-518265 A1 | 5/2009 |
| JP | 2011-529618 A1 | 12/2011 |
| JP | 5158150 B2 | 3/2013 |
| JP | 2013-149586 A1 | 8/2013 |
| WO | 2014/101128 A1 | 7/2014 |

OTHER PUBLICATIONS

Daiju Kubo, et al., "Multifunctional Inorganic Electrode Materials for High-Performance Rechargeable Metal-Air Batteries," *Journal of Materials Chemistry A*, 2013, 1, pp. 6804-6809.

International Search Report and Written Opinion (Application No. PCT/JP2017/009499) dated May 16, 2017 (with English translation).

* cited by examiner

*=TEREPHTHALATE

ELECTRODE MATERIAL FOR BATTERY AND METHOD FOR MANUFACTURING SAME

CROSS-REFERENCE TO RELATED APPLICATIONS

This application is a continuation application of PCT/JP2017/009499 filed Mar. 9, 2017, which claims priority to Japanese Patent Application No. 2016-062182 filed Mar. 25, 2016, the entire contents all of which are incorporated herein by reference.

BACKGROUND OF THE INVENTION

1. Field of the Invention

The present invention relates to electrode materials for cells and methods for producing the same.

2. Description of the Related Art

Figure 1:
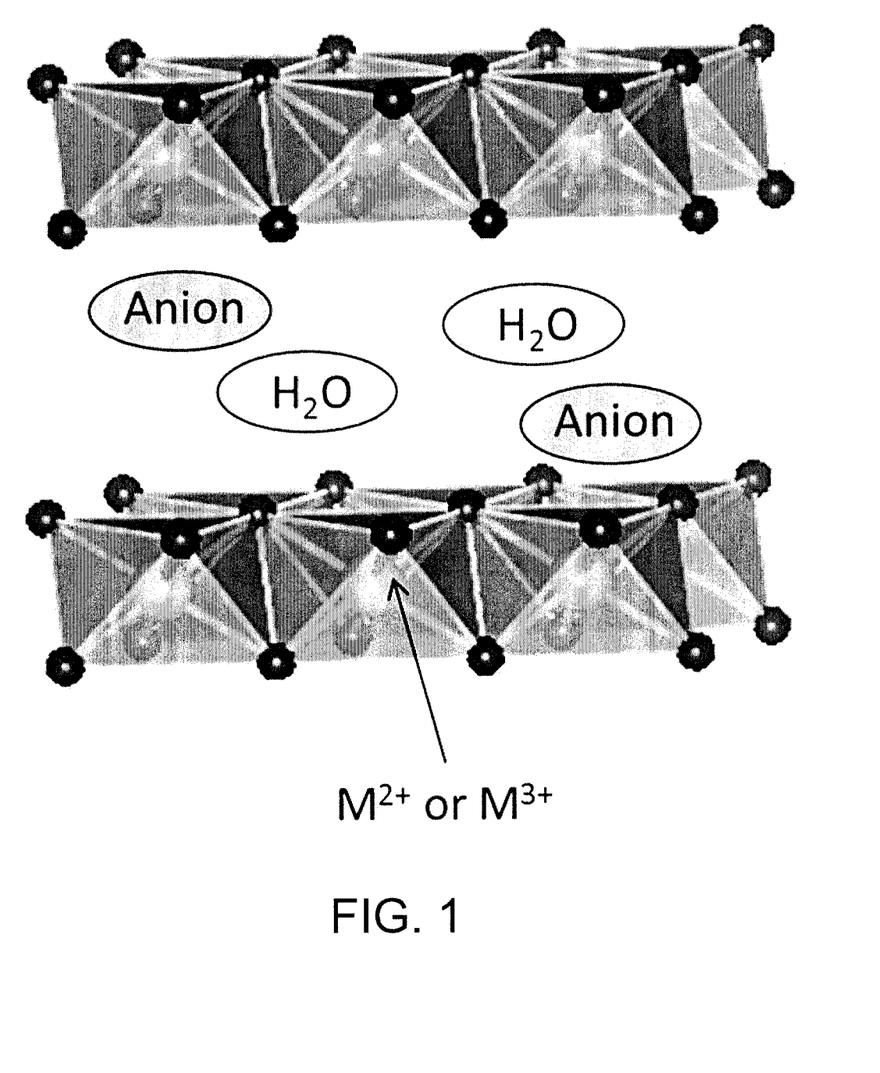
FIG. 1 is a schematic view illustrating the crystal structure of a layered double hydroxide (LDH).

Layered double hydroxides (hereinafter, also referred to as LDHs), such as hydrotalcite, have a crystal structure that contains exchangeable anions between hydroxide layers, as schematically illustrated in FIG. 1. Utilizing such a characteristic structure, these substances are used in catalysts, adsorbents, and dispersants in polymers for improving heat resistance. In particular, the layered double hydroxides have recently been receiving attention in the field of electrode materials for cells and have been examined in a variety of respects.

For example, Patent Document 1 (JP5158150B) discloses an air electrode for a metal-air cell comprising a conductive material and a layered double hydroxide as a catalyst for an air electrode. Non-Patent Document 1 (K. Tadanaga et al., J. Mater. Chem. A, 2013, 1, 6804-6809) discloses a layered double hydroxide which functions as an ion conductive phase of a metal-air cell.

Figure 2:
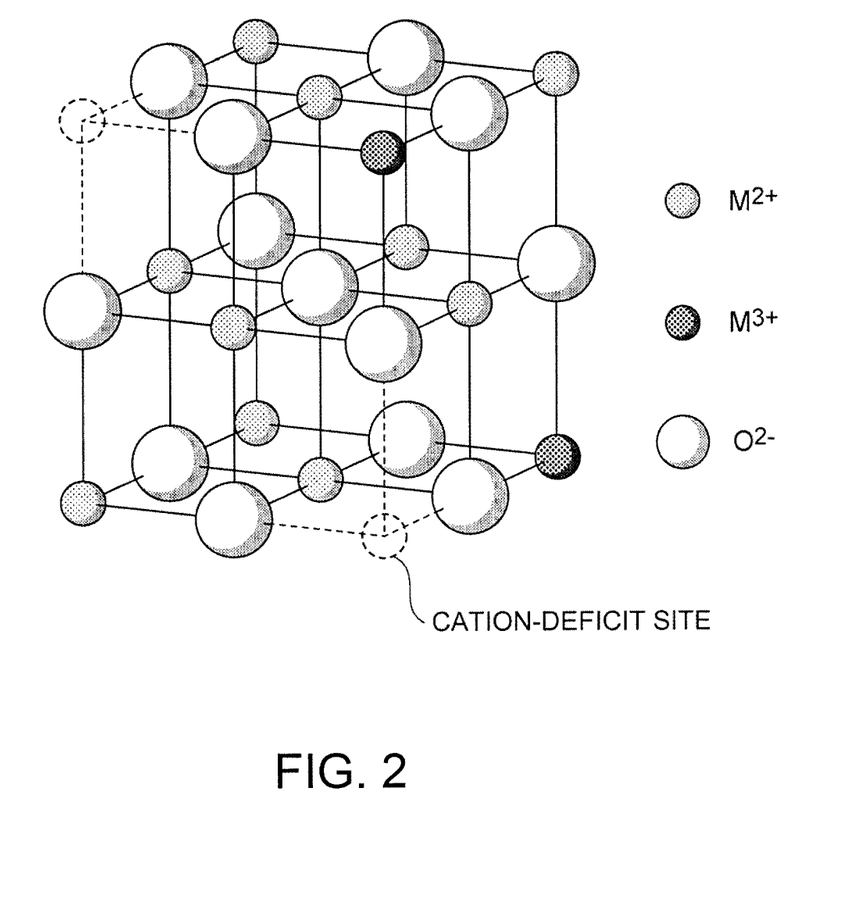
FIG. 2 is a schematic view illustrating a crystal structure of a cation-deficit metal oxide.

Cation-deficit metal oxides prepared through firing of LDHs are also known. The cation-deficit metal oxides are represented by the formula $MO_{1+\delta}$ (where M contains a mono- to hexavalent metal element, and $\delta$ represents the number of cation deficiencies). The cation-deficit metal oxide has a rock-salt crystal structure with cation deficiency schematically illustrated in FIG. 2. For example, Patent Document 2 (JP2013-149586A) discloses a composite metal oxide which is prepared through firing of LDH and is usable as a positive electrode or negative electrode for secondary cells, such as lithium secondary cells. In particular, the composite metal oxide disclosed in this document can provide secondary cells involving a conversion reaction rather than an intercalation reaction, which has been traditionally used in negative electrodes including a carbon material having a small theoretical capacity, such as graphite. In the conversion reaction, a metal oxide is reduced into an elemental metal during a discharge cycle to form lithium oxide ($Li_2O$). According to Patent Document 2, the electrode for a conversion-type secondary cell involving the conversion reaction can achieve low cost, have high energy density, and have high cycle characteristics.

CITATION LIST

Patent Literature

Patent Document 1: JP5158150B
Patent Document 2: JP2013-149586A

Non-Patent Literature

Non-Patent Document 1: K. Tadanaga et al., J. Mater. Chem. A, 2013, 1, 6804-6809

SUMMARY

LDHs and cation-deficit metal oxides have low electron conductivity. It is expected, however, that these materials mixed with carbon can function as positive electrodes for metal-air cells or electrodes for lithium ion cells. Unfortunately, LDHs and cation-deficit metal oxides have insufficient dispersion in mere mixing with carbon, and do not have sufficiently improved performance. Accordingly, LDHs and cation-deficit metal oxides containing highly dispersed carbon (such as LDHs or cation-deficit metal oxides highly complexed with carbon in nanoscale), rather than a mere mixture with carbon, have been desired.

The present inventors have found that a carbon-complexed cation-deficit metal oxide preferably applicable to electrodes for secondary cells, such as lithium ion secondary cells, is prepared through intercalation of an organic molecule into the crystal structure of an LDH followed by firing of the LDH. The present inventors also have found that a carbon complexed LDH preferably applicable to a positive electrode material for air secondary cells is prepared through humidification of a carbon-complexed cation-deficit metal oxide. In other words, the present inventors have developed a carbon-complexed cation-deficit metal oxide and a carbon-complexed LDH which contain highly dispersed carbon and are significantly useful as a secondary electrode material for cells.

Accordingly, an object of the present invention is to provide a carbon-complexed cation-deficit metal oxide and a carbon complexed LDH which contain highly dispersed carbon and are significantly useful as a secondary electrode material for cells.

One aspect according to the present invention is an electrode material for cells, comprising:
  carbon; and
  a crystalline material composed of a layered double hydroxide and/or a cation-deficit metal oxide having a rock-salt structure,
  wherein the carbon is complexed with the layered double hydroxide and/or the cation-deficit metal oxide.

Another aspect according to the present invention is a method of producing the electrode material, comprising the steps of:
  preparing an aqueous basic solution containing an organic substance;
  adding salts of at least two cations to the aqueous basic solution to form a precipitate, the at least two cations being capable of constituting a layered double hydroxide and/or a cation-deficit metal oxide;
  subjecting the precipitate to a hydrothermal treatment in an autoclave to form a layered double hydroxide into which the organic substance is intercalated; and
  firing the layered double hydroxide, into which the organic substance is intercalated, to form a complex of the cation-deficit metal oxide with carbon.

DETAILED DESCRIPTION OF THE INVENTION

Electrode Material for Cells

The present invention relates to an electrode material usable in cells. Preferred examples of cells to which the electrode material according to the present invention is applicable include lithium ion secondary cells, metal-air cells (such as metal-air secondary cells), alkaline fuel cells, and zinc secondary cells. Examples of the zinc secondary cells include nickel zinc secondary cells, silver oxide-zinc secondary cells, manganese oxide-zinc secondary cells, and zinc air secondary cells. Particularly preferred zinc secondary cells are nickel zinc secondary cells and zinc air secondary cells.

The electrode material according to the present invention comprises carbon and a crystalline material. The crystalline material is composed of a layered double hydroxide and/or a cation-deficit metal oxide having a rock-salt structure. The layered double hydroxide typically has a basic composition represented by the formula: $M^{a+}_{1-x}M^{b+}_{x}(OH)_2 A^{n-}_{(a-2+x(-a+b))/n} \cdot mH_2O$ (where $M^{a+}$ is an a-valent cation; $M^{b+}$ is a b-valent cation; $A^{n-}$ is an n-valent anion; a represents 1 to 6; b represents 1 to 6; n represents an integer of 1 or more; x represents 0.1 to 0.4; and m represents 0 or more). The cation-deficit metal oxide has a basic composition represented by the formula $MO_{1+\delta}$ (where M contains an a-valent metal element and a b-valent metal element; a represents 1 to 6; b represents 1 to 6; and δ represents the number of cation deficiencies) having a rock-salt structure. The cation-deficit metal oxide is prepared through the firing of the layered double hydroxide. Carbon is complexed with the cation-deficit metal oxide and/or the layered double hydroxide. In other words, a carbon-complexed cation-deficit metal oxide and carbon-complexed LDH containing highly dispersed carbon (for example, highly complexed with carbon in nanoscale) are produced. These compounds are significantly useful as an electrode material for cells. The highly dispersed carbon in the cation-deficit metal oxide is produced through the intercalation of an organic molecule into the crystal structure of the LDH followed by the firing of the LDH, and cannot be attained by mere mixing of carbon. Such a carbon-complexed cation-deficit metal oxide is preferably applicable to an electrode for cells, such as lithium ion secondary cells. The high dispersion of carbon in the LDH is achieved through the humidification of the carbon-complexed cation-deficit metal oxide. Such a carbon-complexed LDH is preferably applicable to a positive electrode material for air cells.

As described above, carbon is complexed with a cation-deficit metal oxide and/or a layered double hydroxide. In particular, the crystalline material is preferably dispersed in carbon in nanoscale. For example, the crystalline material is preferably in the form of particles having a diameter of 5 to 10 nm and surrounded by carbon. The form of the carbon present in the electrode material can be confirmed by Raman spectroscopy. A preferred form of the carbon typically has at least one peak assigned to graphite in the Raman spectrum of the electrode material.

In a preferred aspect according to the present invention, the crystalline material is composed of a layered double hydroxide. Although the layered double hydroxide has catalytic activity for an air electrode and hydroxide ion conductivity, a complex of a layered double hydroxide with carbon has improved catalytic activity for an air electrode. This is because the area of the reaction field is expanded through the mixing of carbon as an electron conductor with the ion conductive layered double hydroxide. Accordingly, the electrode material according to this aspect is preferably applicable to positive electrodes or air electrodes of metal-air cells, alkaline fuel cells, and zinc secondary cells. The layered double hydroxide typically has a basic composition represented by the formula $M^{a+}_{1-x}M^{b+}_{x}(OH)_2 A^{n-}_{(a-2+x(-a+b))/n} \cdot mH_2O$. In the formula, $M^{a+}$ is an a-valent cation; a represents 1 to 6, preferably 2 to 5, more preferably 2 to 4, still more preferably 2. Particularly preferably, $M^{a+}$ contains at least one of $Ni^{2+}$, $Mn^{2+}$, and $Fe^{2+}$, most preferably $Ni^{2+}$. $M^{b+}$ is a b-valent cation; b represents 1 to 6, preferably 2 to 5, more preferably 2 to 4, still more preferably 3. Most preferably, $M^{b+}$ contains $Al^{3+}$. $M^{a+}$ and $M^{b+}$ are different cations; thus, typically a and b represent different valencies. $A^{n-}$ is an n-valent anion, preferably contains at least one of $OH^-$, $CO_3^{2-}$, anions derived from organic acids, and anions derived from surfactants, more preferably contains $CO_3^{2-}$. n is an integer of 1 or more, preferably 1 or 2. Accordingly, a preferred layered double hydroxide contains at least one of $Ni^{2+}$, $Mn^{2+}$, and $Fe^{2+}$; $Al^{3+}$; and at least one of $OH^-$, $CO_3^{2-}$, anions derived from organic acids, and anions derived from surfactants. x represents 0.1 to 0.4, preferably 0.2 to 0.35. m is a real number or integer of 0 or more, typically more than 0 or 1 or more. $M^{a+}$ does not always have to consist of one cation, and may consist of at least two cations having the same valency or different valencies. For example, at nominally a=2, the divalent cation may be partially replaced with a cation having a different valency as long as the structure of the layered double hydroxide can be maintained. $M^{b+}$ does not always have to consist of the same cation species, and may consist of at least two cation species having the same valency or different valencies. For example, at nominally b=3, the trivalent cation may be partially replaced with a cation having a different valency as long as the structure of the layered double hydroxide can be maintained. $A^{n-}$ does not always have to consist of the same anion species, and may consist of at least two anion species having the same valency or different valencies.

In another preferred aspect according to the present invention, the crystalline material is composed of a cation-deficit metal oxide. The cation-deficit metal oxide typically has a rock-salt structure and a basic composition $MO_{1+\delta}$. Although the cation-deficit metal oxide can function as an electrode active material (a positive active material or a negative electrode active material) for lithium ion secondary cells, a complex of a cation-deficit metal oxide with carbon can have improved electron conductivity, thus improving cycle characteristics of the cell. This is because highly dispersed carbon ensures the electrical connection between particles of the cation-deficit metal oxide, thereby increasing the active material area that governs the cell reaction. Accordingly, the electrode material according to this aspect can be preferably used as a positive electrode or negative electrode for lithium ion secondary cells. In the formula, M contains an a-valent metal element and a b-valent metal element; a represents 1 to 6, preferably 2 to 5, more preferably 2 to 4, still more preferably 2; b represents 1 to 6, preferably 2 to 5, more preferably 2 to 4, still more preferably 3; preferably, M contains at least one selected from the group consisting of Ni, Mn, and Fe; and Al. M contains more preferably Ni and Al. Accordingly, a preferred cation-deficit metal oxide contains at least one selected from the group consisting of Ni, Mn, and Fe; and Al. The a-valent metal element and the b-valent metal element are different metal elements; thus, typically a and b represent different valencies. $\delta$ represents the number of cation deficiencies. Because the number of cation deficiencies $\delta$ is a parameter that cannot be readily determined, the formula $MO_{1+\delta}$ may be abbreviated to MO. The a-valent metal element does not always have to consist of the same metal element, but may consist of at least two metal elements having the same valency or different valencies. For example, at nominally a=2, the divalent metal element may be partially replaced with a metal element having a different valency as long as the rock-salt structure can be maintained. The b-valent metal element does not always have to consist of the same metal element, but may consist of at least two metal elements having the same valency or different valencies. For example, at nominally b=3, the trivalent metal element may be partially replaced with a metal element having a different valency as long as the rock-salt structure can be maintained.

Production of Electrode Material

The method of producing an electrode material according to the present invention involves preparation of an aqueous solution, formation of precipitate, hydrothermal treatment, firing, and optional reconstruction. These steps will now be described in detail.

(1) Preparation of Aqueous Solution

An aqueous basic solution containing an organic substance is prepared. The amount of the organic substance is preferably equal to the total molar amount of cationic metal to be added dropwise later. The aqueous basic solution has a pH of preferably 8 to 14, more preferably 9 to 13. Examples of the aqueous basic solution include an aqueous sodium hydroxide solution. The aqueous basic solution containing the organic substance can be preferably prepared by adding the organic substance to distilled water, allowing the organic substance to be dissolved in an aqueous basic solution, and adjusting the pH within the above range.

In a preferred aspect according to the present invention, the organic substance is an organic acid. Preferred examples of the organic acid include carboxylic acids, sulfonic acids, and combinations thereof. Particularly preferred organic acids are carboxylic acids. The carboxylic acids are organic compounds having preferably 1 to 50 carbon atoms, more preferably 1 to 40 carbon atoms, still more preferably 1 to 30 carbon atoms, particularly preferably 1 to 20 carbon atoms. The carboxylic acids have a molecular size of preferably 5 Å to 50 Å, more preferably 5 Å to 40 Å. Particularly preferred carboxylic acids include sebacic acid (molecular size: 14.8 Å), terephthalic acid (molecular size: 10.1 Å), and combinations thereof.

In another preferred aspect according to the present invention, the organic substance is a surfactant. The surfactant may be any of ionic surfactants and nonionic surfactants. Preferred are ionic surfactants. Examples of the ionic surfactants include anionic surfactants, cationic surfactants, amphoteric surfactants, and combinations thereof. Preferred are anionic surfactants. The anionic surfactants are organic compounds having preferably 1 to 50 carbon atoms, more preferably 1 to 40 carbon atoms, still more preferably 1 to 30 carbon atoms. The anionic surfactants have a molecular size of preferably 5 Å to 50 Å, more preferably 5 Å to 40 Å. A particularly preferred anionic surfactant is sodium dodecylbenzenesulfonate (molecular size: 29.8 Å or more).

(2) Formation of Precipitate

Salts of at least two cations (namely, salt of an a-valent cation and salt of a b-valent cation) which can constitute a layered double hydroxide and/or a cation-deficit metal oxide are added to an aqueous basic solution to form a precipitate. The salt of the a-valent cation and the salt of the b-valent cation may be any salts which can feed cations that contribute to the formation of the LDH described above. Preferred examples of these salts include nitrates, chlorides, sulfates, and hydrates thereof. Preferred examples of the a-valent cation ($M^{a+}$) include $Ni^{2+}$, $Mn^{2+}$, $Fe^{2+}$, and combinations thereof. A preferred example of the b-valent cation ($M^{b+}$) is $Al^{3+}$. The molar ratio ($M^{a+}/M^{b+}$) of the a-valent cation ($M^{a+}$) to the b-valent cation ($M^{b+}$) may be any value that satisfies the relation represented by the formula of the layered double hydroxide described above.

The precipitate is preferably formed at a constant pH of the aqueous basic solution. The pH of the aqueous basic solution may be preferably maintained by gradually adding a mixed aqueous solution of a salt of an a-valent cation and a salt of a b-valent cation, and simultaneously adding an aqueous strongly alkaline solution, such as an aqueous sodium hydroxide solution.

(3) Hydrothermal Treatment

The precipitate is subjected to a hydrothermal treatment in an autoclave to form a layered double hydroxide containing an intercalation of the organic substance. The temperature for the hydrothermal treatment is preferably 40 to 200° C. The time for the hydrothermal treatment is preferably 1 to 24 hours. The hydrothermally treated product is preferably filtered, is washed, and is dried. The drying is preferably performed at a high temperature (for example, 40 to 150° C.). A layered double hydroxide containing an intercalation of the organic substance is thereby yielded.

(4) Firing

The layered double hydroxide containing an intercalation of the organic substance is fired into a complex of a cation-deficit metal oxide with carbon. The firing temperature may be any temperature, and may be appropriately determined according to the intercalated organic substance. The firing temperature is preferably more than 300° C. and less than 600° C., more preferably 350° C. or more and 550° C. or less, still more preferably 400° C. or more and 500° C. or less. The firing is preferably performed in an atmosphere under reduced pressure. The atmosphere is preferably an inert atmosphere of Ar. The firing time is preferably at least one hour, more preferably in the range of 5 to 24 hours.

(5) Reconstruction

The complex of the cation-deficit metal oxide with carbon is brought into contact with water to reconstruct the layered double hydroxide, thereby yielding a complex of the layered double hydroxide with carbon. At this time, at least one selected from the group consisting of $CO_2$, hydroxides, chlorides, nitrates, organic acids, and surfactants is preferably dissolved in water. Examples of the hydroxides include sodium hydroxide. Examples of the chlorides include sodium chloride. Examples of nitrates include sodium nitrate. Examples of the organic acids and the surfactants include those described above. Such a substance dissolved in water serves as a source for the interlayer anion of the LDH to be reconstructed, facilitating the reconstruction of the LDH. The substance is brought into contact with water at preferably 0 to 200° C., more preferably 5 to 150° C., still more preferably 10 to 100° C.

EXAMPLES

The present invention will be more specifically described by way of Examples below.

Example 1: Synthesis of LDH Containing Intercalation of Organic Molecule

Terephthalic acid (molecular size: 10.1 Å), sebacic acid (molecular size: 14.8 Å), and sodium dodecylbenzenesulfonate (molecular size: 29.8 Å or more) were provided as organic substances. Each of the anions derived from these organic substances (organic anions) was attempted to be introduced into the LDH interlayer. An organic substance to be introduced was added to distilled water such that the amount thereof was equal to the total molar amount of cationic metal to be added dropwise, and was dissolved in an aqueous solution of 1 M sodium hydroxide. The solution was adjusted to have a pH around 11. A mixed aqueous solution (molar ratio: Ni/Al=2) containing $Ni(NO_3)_2 \cdot 6H_2O$ (made by KISHIDA CHEMICAL Co., Ltd., Super grade) and $Al(NO_3)_3 \cdot 9H_2O$ (made by KISHIDA CHEMICAL Co., Ltd., Super grade) was then gradually added dropwise under stirring. At this time, an aqueous solution of 1 M sodium hydroxide was simultaneously added dropwise to keep the pH at 11. After the formation of a precipitate, the precipitate was sealed in an autoclave, and was subjected to a hydrothermal treatment at 170° C. for 18 hours. The hydrothermally treated product was filtered, was washed, and was vacuum dried at 120° C. overnight. LDHs containing intercalations of the organic molecule were thus yielded.

For reference, an LDH containing carbonate as an interlayer anion and not containing any intercalation of the organic molecule was prepared as above except that sodium carbonate was added in place of the organic substance.

Figure 3:
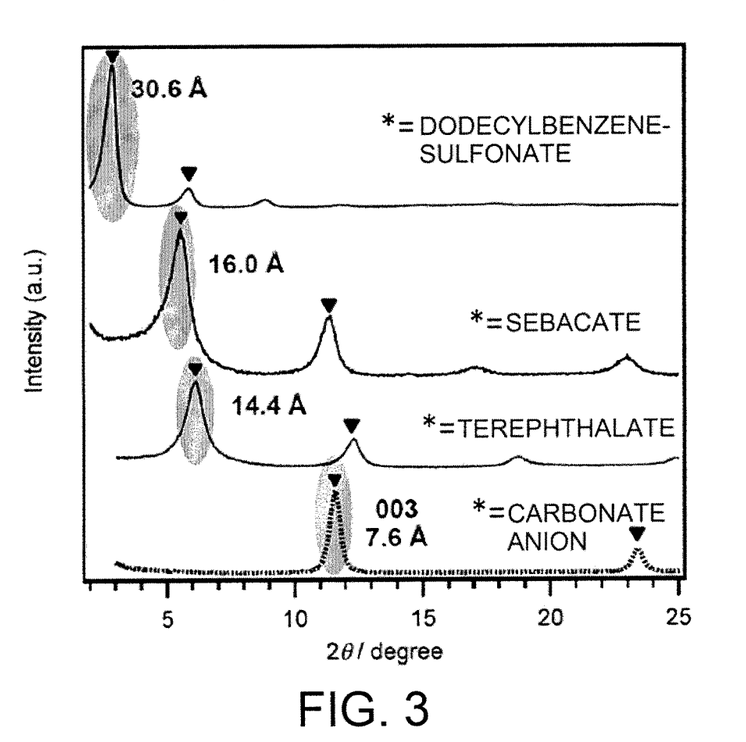
FIG. 3 illustrates data from the XRD measurement of organic molecule-intercalated LDHs prepared in Example 1, where the LDHs contain a variety of organic molecule intercalations. In the drawing, symbol * represents the type of interlayer anions intercalated into the LDHs.

The synthesis of the organic molecule-intercalated LDHs was confirmed by XRD and TG-DTA. The XRD data of the LDHs is shown in FIG. 3. In FIG. 3, symbol * represents the interlayer anion species in the LDH. In FIG. 3, in the case where the interlayer anion was carbonate ($CO_3^{2-}$), the peaks assigned to the LDH were detected around 12° and 24°. Those peaks confirmed that the carbonate anion-intercalated LDH was synthesized. FIG. 3 also demonstrates that samples synthesized using terephthalic acid, sebacic acid, or sodium dodecylbenzenesulfonate in place of carbonic acid have peaks assigned to a (003) plane and a (006) plane indicating that these samples also have a crystal structure of LDH.

Figure 4:
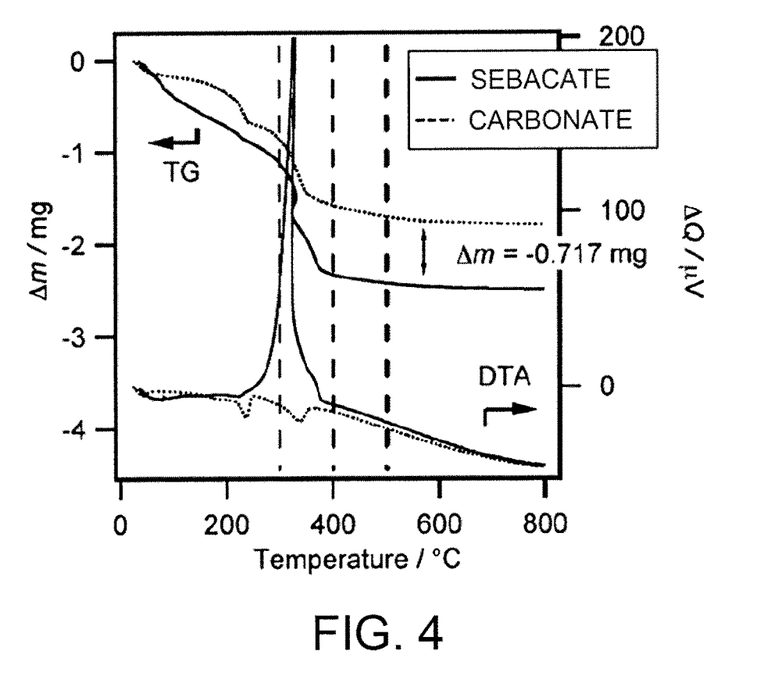
FIG. 4 illustrates TG-DTA thermograms of the organic molecule-intercalated LDHs in Example 1.

The data of these samples also suggests that the intercalation of the organic molecule expanded the interlayer width of the LDH, because their peaks assigned to a (003) plane and a (006) plane were shifted to a lower degree than that of the carbonate anion-intercalated LDH. FIG. 4 shows the DTA curve from the TG-DTA measurement of the LDH sample containing intercalated sebacate and an LDH sample not containing any intercalation of the organic substance (where the interlayer anion was carbonate). As shown in FIG. 4, an exothermic peak was observed near 300° C. in the sample prepared through the mixing of sebacic acid. This is considered as the exothermic peak caused by the combustion of the organic substance (sebacic acid in this case), and suggests that sebacic acid was taken into the LDH in the sample synthesized through the mixing of sebacic acid. From these results, it was confirmed that organic molecule-intercalated LDHs containing intercalations of the organic molecules into their interlayers were yielded.

Example 2: Synthesis of Carbon-Complexed Cation-Deficit Metal Oxide

The LDH containing an intercalation of the organic molecule into the interlayer prepared in Example 1 was fired for 18 hours at a variety of temperatures ranging from 300 to 700° C. in an Ar atmosphere under reduced pressure. This firing was performed at temperatures of 300° C., 350° C., 400° C., 500° C., 600° C., and 700° C. for the LDH containing intercalated sebacate, or at temperatures of 400° C. and 500° C. for the LDH containing intercalated terephthalate.

Figure 6:
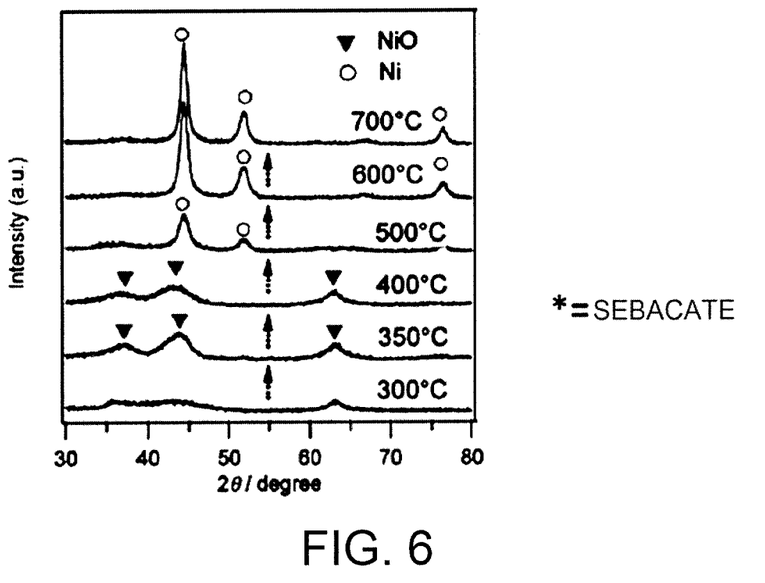
FIG. 6 illustrates data from the XRD measurement of samples in Example 2, the samples being prepared through firing of an LDH containing intercalated sebacate at temperatures from 300 to 700° C.
Figure 7:
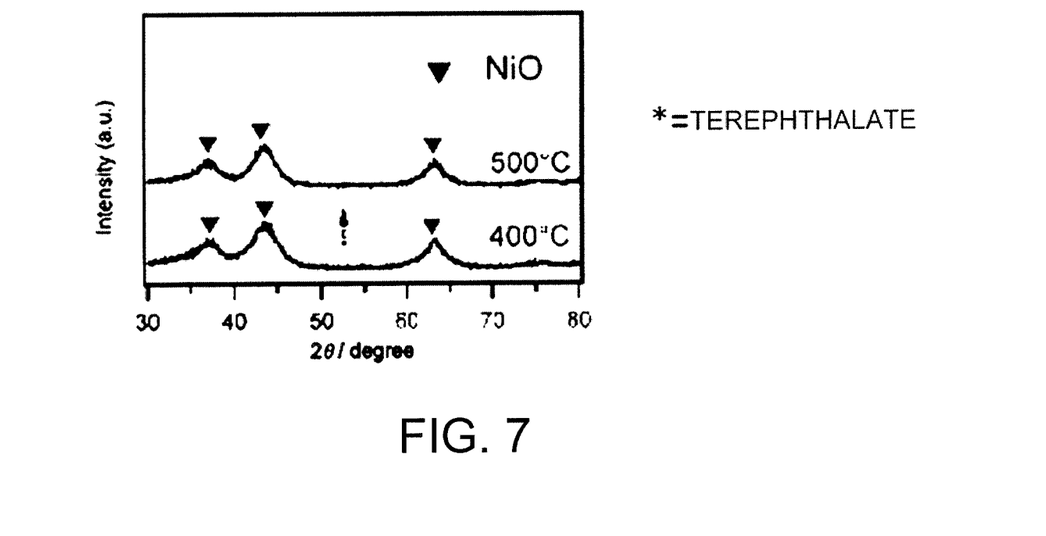
FIG. 7 illustrates XRD data of a sample prepared through firing at 400° C. and 500° C. of an LDH containing intercalated terephthalate in Example 2.

The organic molecule-intercalated LDHs were fired as above, and the fired products were subjected to Raman spectroscopy and XRD. As a result, the data shown in FIGS. 5 to 7 was obtained. Some of the results shown in FIGS. 5 to 7 show that the fired product of the organic molecule-intercalated LDH corresponds to a complex of carbon and metal oxide.

Figure 5:
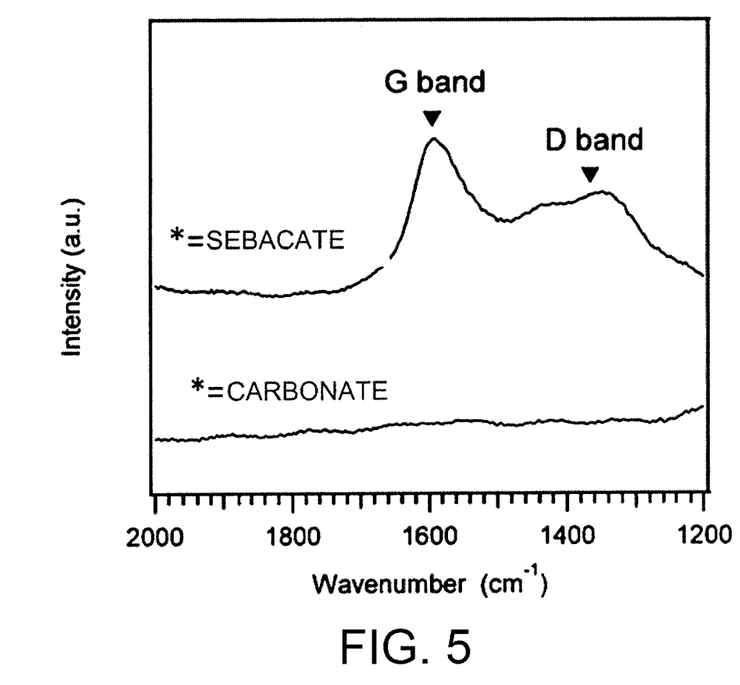
FIG. 5 illustrates Raman spectra of a sample prepared through firing at 400° C. of an organic molecule-intercalated LDH in Example 2. In the drawing, symbol * represents the type of interlayer anions intercalated into the LDHs.

In other words, as shown in FIG. 5, peaks called G band and D band were observed around 1600 $cm^{-1}$ and 1400 $cm^{-1}$, respectively, in Raman spectroscopy of a sample prepared through firing at 400° C. of sebacic acid-introduced LDH. The G band and the D band indicate the presence of graphite-like carbon and diamond-like carbon, respectively, and suggest that the fired sample contained carbon. The XRD shown in FIGS. 6 and 7 revealed that the firing of the LDH containing intercalated sebacate or terephthalate can form a metal oxide having an NiO structure. Accordingly, it is suggested that a carbon-complexed metal oxide which is a complex of carbon (confirmed by Raman spectroscopy) and metal oxide (confirmed by XRD) is formed through the firing of the organic molecule-intercalated LDH. The XRD data also revealed that the carbon-complexed metal oxide had the same rock-salt pattern as that of NiO. No reflection assigned to impurities was observed. These results suggest that this metal oxide has a rock-salt type structure of M(II)O (here, NiO) illustrated in FIG. 2 in which trivalent Al is present in the form of solid solution to cause cation deficiency for compensation of charge. In other words, it is suggested that a carbon-complexed cation-deficit metal oxide was yielded.

Figure 8:
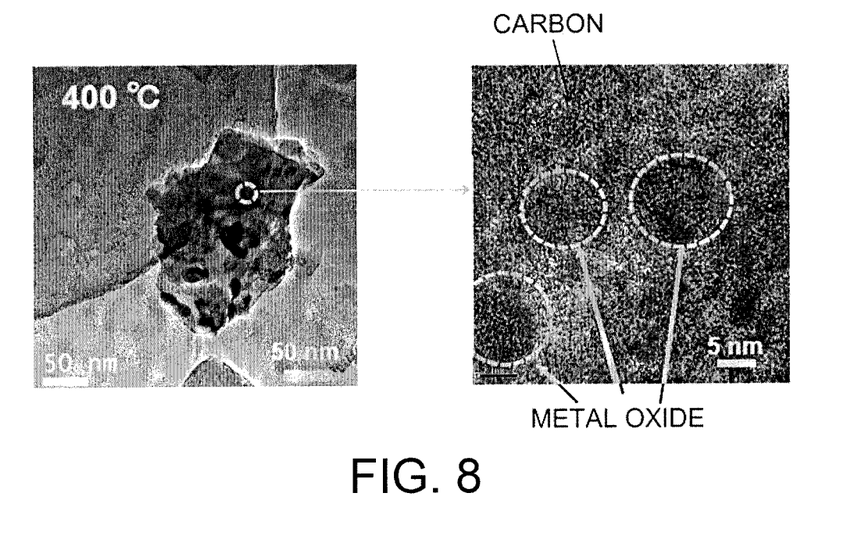
FIG. 8 illustrates a TEM image of a sample prepared through firing at 400° C. of an LDH containing intercalated sebacate in Example 2.

FIG. 8 shows the TEM images of a sample (that is, carbon-complexed cation-deficit metal oxide) prepared through firing at 400° C. of an LDH containing intercalated sebacate. In the TEM images, a lattice pattern (portions encircled in the image on the right in FIG. 8) attributed to a crystalline substance was confirmed. No lattice patterns were observed in other portions. It was inferred that these portions were to be assigned to amorphous carbon. The metal oxide has a particulate form having a diameter of 5 to 10 nm. This indicates that fine metal oxide nanoparticles having a diameter of 5 to 10 nm are mixed with carbon without aggregation, and are highly dispersed. In other words, it shows that the crystalline material is dispersed in a carbon matrix in nanoscale. More specifically, the crystalline material are particles having a diameter of 5 to 10 nm, and the particles of the crystalline material is surrounded by carbon.

Example 3: Formation of Carbon-Complexed LDH

The carbon-complexed cation-deficit metal oxide prepared in Example 2 and deionized water were sealed in an autoclave in the air, and were hydrothermally treated at 100° C. for five hours to yield a carbon-complexed LDH. The resulting sample was spontaneously dehydrated (dried) in a room at 25° C. and a relative humidity of about 80% to yield a target carbon-complexed LDH.

What is claimed is:

1. An electrode material for a cell, comprising:
    carbon; and
    a crystalline material composed of a layered double hydroxide and/or a cation-deficit metal oxide having a rock-salt structure,
    wherein the carbon is complexed into the crystal structure of the layered double hydroxide and/or the cation-deficit metal oxide, and wherein the crystalline material has a particulate form having a diameter of 5 to 10 nm, and particles of the crystalline material are surrounded by the carbon,
    wherein the crystalline material is dispersed in a carbon matrix in nanoscale.

2. The electrode material according to claim 1, wherein the crystalline material is composed of the layered double hydroxide.

3. The electrode material according to claim 1, wherein the crystalline material is composed of the cation-deficit metal oxide.

4. The electrode material according to claim 1, wherein at least one of peaks assigned to the carbon is assigned to graphite in a Raman spectrum.

5. The electrode material according to claim 1, wherein the cell is selected from the group consisting of lithium ion secondary cells, metal-air cells, alkali fuel cells, and zinc secondary cells.

6. A method of producing the electrode material according to claim 1, the method comprising the steps of:
    preparing an aqueous basic solution containing an organic substance;
    adding salts of at least two cations to the aqueous basic solution to form a precipitate, the at least two cations being capable of constituting the layered double hydroxide and/or the cation-deficit metal oxide;
    subjecting the precipitate to a hydrothermal treatment in an autoclave to form the layered double hydroxide into which the organic substance is intercalated; and
    firing the layered double hydroxide, into which the organic substance is intercalated, to form a complex of the cation-deficit metal oxide with carbon.

7. The method according to claim 6, wherein the aqueous basic solution has a pH of 8 to 14, and the formation of the precipitate is performed while the pH is being kept.

8. The method according to claim 6, wherein the organic substance is an organic acid.

9. The method according to claim 8, wherein the organic acid is a carboxylic acid.

10. The method according to claim 9, wherein the carboxylic acid is an organic compound having 1 to 50 carbon atoms.

11. The method according to claim 9, wherein the carboxylic acid has a molecular size of 5 Å to 50 Å.

12. The method according to claim 9, wherein the carboxylic acid is at least one selected from the group consisting of sebacic acid and terephthalic acid.

13. The method according to claim 6, wherein the organic substance is a surfactant.

14. The method according to claim 13, wherein the surfactant is an ionic surfactant.

15. The method according to claim 14, wherein the ionic surfactant is an anionic surfactant.

16. The method according to claim 15, wherein the anionic surfactant is an organic compound having 1 to 50 carbon atoms.

17. The method according to claim 15, wherein the anionic surfactant has a molecular size of 5 Å to 50 Å.

18. The method according to claim 15, wherein the anionic surfactant is sodium dodecylbenzenesulfonate.

19. The method according to claim 6, wherein the firing is performed at a temperature of more than 300° C. and less than 600° C.

20. The method according to claim 6, wherein the firing is performed in an atmosphere under reduced pressure.

21. The method according to claim 6, further comprising the step of bringing the cation-deficit metal oxide complexed with the carbon into contact with water to reconstruct the layered double hydroxide, thereby yielding a complex of the layered double hydroxide and the carbon.

22. The method according to claim 21, wherein at least one selected from the group consisting of $CO_2$, hydroxides, chlorides, nitrates, organic acids, and surfactants is dissolved in the water.

23. The method according to claim 21, wherein the contact with water is performed at 20 to 200° C.

* * * * *